US011153923B2

(12) United States Patent
Qin

(10) Patent No.: US 11,153,923 B2
(45) Date of Patent: *Oct. 19, 2021

(54) ELECTRONIC APPARATUS IN WIRELESS COMMUNICATION SYSTEM, AND MOBILITY MEASUREMENT METHOD

(71) Applicant: SONY CORPORATION, Tokyo (JP)

(72) Inventor: Zhongbin Qin, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/110,904

(22) Filed: Aug. 23, 2018

(65) Prior Publication Data

US 2018/0368201 A1 Dec. 20, 2018

Related U.S. Application Data

(62) Division of application No. 15/317,369, filed as application No. PCT/CN2015/080865 on Jun. 5, 2015, now Pat. No. 10,334,655.

(30) Foreign Application Priority Data

Jun. 23, 2014 (CN) .......................... 201410283433.2

(51) Int. Cl.
H04W 76/18 (2018.01)
H04W 24/02 (2009.01)
(Continued)

(52) U.S. Cl.
CPC ............. *H04W 76/18* (2018.02); *H04W 8/02* (2013.01); *H04W 24/02* (2013.01); *H04W 24/10* (2013.01);
(Continued)

(58) Field of Classification Search
CPC ............. H04W 76/18; H04W 36/0066; H04W 36/0022; H04W 76/19; H04W 36/0072;
(Continued)

(56) References Cited

U.S. PATENT DOCUMENTS

2006/0276191 A1* 12/2006 Hwang ................. H04W 36/30
455/436
2007/0047493 A1* 3/2007 Park .................. H04W 36/0055
370/331
(Continued)

FOREIGN PATENT DOCUMENTS

CN 102883380 A 1/2013
KR 20150086593 A * 7/2015
(Continued)

OTHER PUBLICATIONS

Partial Supplementary European Search Report dated Nov. 21, 2017 in Patent Application 15811249.0.
(Continued)

Primary Examiner — Tejis Daya
(74) Attorney, Agent, or Firm — Xsensus LLP

(57) ABSTRACT

An electronic apparatus in a wireless communications system, and a mobility measurement method. The electronic apparatus includes a communications device and a mobility measurement device. The communication device is configured to separately perform dual-connection communication with two connection nodes by different carriers. The mobility measurement device is configured to perform mobility measurement, for determining a connection switching mode, on the connection nodes in the dual connections in a case in which connection service quality of at least one of the current dual connection nodes is lower than a preset level. The mobility measurement device is further configured to determine a reporting mode of a mobility measurement (Continued)

result according to the measurement condition of at least one of the current dual connection nodes.

18 Claims, 8 Drawing Sheets

(51) Int. Cl.
| | |
|---|---|
| *H04W 76/00* | (2018.01) |
| *H04W 36/30* | (2009.01) |
| *H04W 76/20* | (2018.01) |
| *H04W 8/02* | (2009.01) |
| *H04W 24/10* | (2009.01) |
| *H04W 72/08* | (2009.01) |
| *H04W 76/19* | (2018.01) |
| *H04W 76/15* | (2018.01) |
| *H04W 36/00* | (2009.01) |
| *H04W 88/06* | (2009.01) |

(52) U.S. Cl.
CPC ... *H04W 36/0022* (2013.01); *H04W 36/0066* (2013.01); *H04W 36/0072* (2013.01); *H04W 36/30* (2013.01); *H04W 36/305* (2018.08); *H04W 72/085* (2013.01); *H04W 76/00* (2013.01); *H04W 76/15* (2018.02); *H04W 76/19* (2018.02); *H04W 76/20* (2018.02); *H04W 88/06* (2013.01)

(58) Field of Classification Search
CPC ....... H04W 36/30; H04W 8/02; H04W 76/20; H04W 72/085; H04W 24/10; H04W 76/15; H04W 76/00; H04W 24/02; H04W 88/06
See application file for complete search history.

(56) References Cited

U.S. PATENT DOCUMENTS

| | | | | |
|---|---|---|---|---|
| 2010/0130219 A1* | 5/2010 | Cave | ...................... | H04W 72/02 455/450 |
| 2012/0281548 A1* | 11/2012 | Lin | ....................... | H04W 76/18 370/242 |
| 2012/0327901 A1* | 12/2012 | Ahluwalia | ............... | H04L 47/34 370/331 |
| 2013/0034013 A1* | 2/2013 | Jung | ...................... | H04W 24/08 370/252 |
| 2013/0035085 A1* | 2/2013 | Axell | ..................... | H04W 24/10 455/419 |
| 2013/0121167 A1* | 5/2013 | Wong | ..................... | H04W 76/20 370/242 |
| 2013/0178216 A1* | 7/2013 | Chang | ................... | H04W 24/10 455/437 |
| 2013/0215772 A1 | 8/2013 | Kaur et al. | | |
| 2013/0294307 A1* | 11/2013 | Johansson | ......... | H04W 52/0216 370/311 |
| 2014/0119207 A1* | 5/2014 | Yamada | ................ | H04L 5/0085 370/252 |
| 2014/0192740 A1* | 7/2014 | Ekpenyong | ............ | H04L 5/0035 370/329 |
| 2014/0335869 A1 | 11/2014 | Choi et al. | | |
| 2014/0355569 A1* | 12/2014 | Chun | ................... | H04J 11/0069 370/331 |
| 2015/0045035 A1* | 2/2015 | Nigam | .............. | H04W 36/0079 455/436 |
| 2015/0055620 A1* | 2/2015 | Vesterinen | ............ | H04W 36/18 370/331 |
| 2015/0055621 A1* | 2/2015 | Koskinen | .............. | H04W 36/18 370/331 |
| 2015/0078335 A1* | 3/2015 | Sivanesan | .............. | H04N 7/147 370/331 |
| 2015/0195800 A1* | 7/2015 | Zhu | ...................... | H04L 5/0057 370/311 |
| 2015/0271717 A1* | 9/2015 | Moon | ................... | H04W 76/18 455/437 |
| 2016/0073442 A1* | 3/2016 | Koskinen | .............. | H04W 76/15 370/329 |
| 2016/0270140 A1 | 9/2016 | Kaur et al. | | |
| 2016/0345231 A1* | 11/2016 | Moon | ............... | H04W 36/0055 |
| 2017/0302481 A1* | 10/2017 | Wu | ....................... | H04L 5/0048 |
| 2019/0182674 A1* | 6/2019 | Li | .......................... | H04L 9/0861 |

FOREIGN PATENT DOCUMENTS

| | | | | |
|---|---|---|---|---|
| KR | 20150110407 A | * | 10/2015 | ............ H04W 76/38 |
| WO | 2011156769 A1 | | 12/2011 | |
| WO | 2013/185354 A1 | | 12/2013 | |
| WO | 2014021761 A2 | | 2/2014 | |
| WO | 2014177089 A1 | | 11/2014 | |
| WO | 2014182229 A1 | | 11/2014 | |
| WO | 2015019172 A2 | | 2/2015 | |
| WO | 2014025196 A1 | | 6/2015 | |

OTHER PUBLICATIONS

"Initial Setup Procedure for Dual Connectivity" Sharp, 3GPP TSG-RAN WG2#83, R2-132750, vol. RAN WG2, XP050718300, Aug. 9, 2013, pp. 1-3.

"Discussion on RRM Measurements for SCG in Dual Connectivity" Huawei, HiSilicon, 3GPP TSG-RAN WG2 Meeting #85bis, R2-141289, vol. RAN WG2, XP050817800, Mar. 22, 2014, 5 Pages.

"Measurement Report Triggering for Dual Connectivity" CMCC, CATT, Fujitsu, 3GPP TSG-RAN WG2 Meeting #85bis, R2-142320, vol. RAN WG2, XP050793490, May 18, 2014, pp. 1-3.

"3rd Generation Partnership Project; Technical Specification Group Radio Access Network; Evolved Universal Terrestrial Radio Access (E-UTRA); Radio Resource Control (RRC); Protocol Specification (Release 12)" 3GPP TS 36.331 V12.1.0 (Mar. 2014), vol. RAN WG2, No. V12.1.0, XP050769960, Mar. 19, 2014, pp. 1-100.

"3rd Generation Partnership Project; Technical Specification Group Radio Access Network; Study on Small Cell Enhancements for E-UTRA and E-UTRAN; Higher Layer Aspects (Release 12)" 3GPP TR 36.842 V12.0.0 (Dec. 2013), vol. RAN WG2, No. V12.0.0, XP051293257, Jan. 7, 2014, pp. 1-71.

Korean Office Action dated Aug. 18, 2017 in Patent Application No. 10-2016-7034203 (with Partial English Translation).

Broadcom Corporation, "Measurement Report Triggering for Dual Connectivity", 3 GPP TSG-RAN WG2 Meeting #86, R2-142128, May 19-23, 2014, 4 pages.

NSN, Nokia Corporation, "SeNB Failure Reporting", 3 GPP TSG-RAN WG2 Meeting #86, R2-142310, May 19-23, 2014, 8 pages.

International Search Report dated Sep. 9, 2015 in PCT/CN15/080865 Filed Jun. 5, 2015.

Office Action issued in Chinese Application 201410283433.2 dated Jun. 26, 2019.

ITRI, "Further Discussion on RLF Handling in Dual Connectivity", 3GPP TSG-RAN WG2 Meeting #85bis, Tdoc R2-141345, 3 Pages total, (Mar. 31-Apr. 4, 2014).

Extended Search Report issued in European Application 19178509.6-1214 dated Dec. 20, 2019.

Catt, et al., "RLM Considerations for Dual Connectivity", 3GPP TSG RAN WG2 Meeting #84, R2-134053, 4 Pages total, (Nov. 11-15, 2013).

Ericsson, "RLF Handling in Dual Connectivity", 3GPP TSG RAN WG2 #85, R2-140655, 4 Pages total, (Feb. 10-14, 2014).

Intel Corporation, "Radio Link Failure Handling for Dual Connectivity", 3GPP TSG RAN WG2 Meeting #85, R2-140828, 4 Pages total, (Feb. 10-14, 2014).

Brazilian Office Action dated Sep. 24, 2020, issued in corresponding Brazilian Patent Application No. BR112016029659, 6 pages with English Translation.

Broadcom Corporation, "Measurement report triggering for Dual Connectivity," 3GPP TSG-RAN WG2 Meeting #86, R2-142128, May 9, 2014 <http://www.3gpp.org/ftp/tsg_ran/WG2_RL2/TSGR2_86/Docs/R2-142128.zip>.

(56) References Cited

OTHER PUBLICATIONS

Microsoft Corporation, "Measurement events for PSCell's Management," 3GPP TSG-RAN WG2 Meeting #86, R2-142189, May 9, 2014 <http://www.3gpp.org/ftp/ tsg_ran/WG2_RL2/TSGR2_86/Docs/R2-142189.zig>.

NSN, Nokia Corporation, "SeNB Failure Reporting," 3GPP TSG-RAN WG2 Meeting #86, R2-142310, May 9, 2014 <http://www.3gpp.org/ftp/tsg_ran/WG2_RL2/TSGR2 _86/Docs/R2-142310.zip>.

\* cited by examiner

ELECTRONIC APPARATUS IN WIRELESS COMMUNICATION SYSTEM, AND MOBILITY MEASUREMENT METHOD

CROSS-REFERENCE TO RELATED APPLICATIONS

This application is a divisional of National Stage application Ser. No. 15/317,369 filed Dec. 8, 2016, claiming priority to International Patent Application No. PCT/CN2015/080865 filed Jun. 5, 2015, claiming priority to Chinese Patent Application No. 201410283433.2 filed Jun. 23, 2014, all of which are herein incorporated by reference in their entirety.

TECHNICAL FIELD

The disclosure generally relates to the field of wireless communication, and more particularly, to an electronic apparatus in a wireless communication system and a method of performing mobility measurement by a mobile communication terminal.

BACKGROUND

At present, the following measurement events are defined in a LTE (long-term evolution)/LTE-A (advanced long-term evolution) system:

An A1 event, in which a serving cell has a quality higher than an absolute threshold, for turning off an on-going inter-frequency measurement and deactivating a measurement gap.

An A2 event, in which a serving cell has a quality lower than an absolute threshold, for turning on inter-frequency measurement and activating a measurement gap.

An A3 event, in which a neighbor cell has a quality higher than that of a main serving cell by an amount higher than an absolute threshold, for a coverage-based inter-frequency/intra-frequency handover.

An A4 event, in which a neighbor cell has a quality higher than an absolute threshold, mainly for a load-based handover.

An A5 event, in which a main serving cell has a quality lower than a first absolute threshold 1 and a neighbor cell has a quality higher than a second absolute threshold 2, for a coverage-based inter-frequency/intra-frequency handover.

An A6 event, in which a neighbor cell has a quality higher than that of a secondary serving cell by an amount higher than an absolute threshold, for a coverage-based inter-frequency secondary carrier adjustment.

A B1 event, in which a neighbor cell in a different system has a quality higher than an absolute threshold, for a load-based handover.

A B2 event, in which a serving cell has a quality lower than a first absolute threshold 1 and a neighbor cell in a different system has a quality higher than a second absolute threshold 2, for a coverage-based handover.

The A1/A2 event may be used for turning off or triggering inter-frequency measurement by a terminal. The A3/A5/B2 event may be used for a coverage-based inter-system/intra-system handover. The A6 event may be used for a coverage-based secondary carrier adjustment in a scenario of carrier aggregation. The A4/B1 event may be used for a load-based inter-system/intra-system handover.

SUMMARY

In a scenario of dual-connection, a terminal is simultaneously connected to two base stations which have no ideal backhaul, such mobility scenario is more complicated than that of a single base station connection or a dual-base station connection with ideal backhaul carrier aggregation. Therefore, embodiments of the disclosure are provided for the above dual-connection scenario.

A brief summary of the embodiments of the present disclosure are provided below to provide some basic understanding to some aspects of the present disclosure. It should be understood that the summary is not exhaustive, and is not intended to identify a crucial or important part of the present disclosure or limit the scope of the present disclosure. The only purpose is to give some conception in a simplified manner as a prelude to the detailed description provided later.

According to an aspect of the present disclosure, an electronic apparatus in a wireless communication system is provided. The electronic apparatus includes a communication device and a mobility measurement device. The communication device is configured for performing dual-connection communication with two connection nodes respectively via different carriers. The mobility measurement device is configured for performing mobility measurement on a connection node of current dual-connection for determining a connection transfer mode, in a case that a service quality of at least one of the current dual-connection nodes is lower than a predetermined level. The mobility measurement is further configured for determining a mode for reporting a result of the mobility measurement based on a measurement condition of at least one of the current dual-connection nodes.

According to another aspect of the present disclosure, a method of performing mobility measurement by a mobile communication terminal is provided. The method includes a step of performing mobility measurement on current dual-connection nodes for determining a connection transfer mode in a case that a service quality of at least one of the current dual-connection nodes for the mobile communication terminal communicating in a dual-connection scenario is lower than a predetermined level. The method also includes a step of determining a mode for reporting a result of the mobility measurement based on a measurement condition of at least one of the current dual-connection nodes.

The embodiments of the present disclosure are advantageous for improving the efficiency of reporting measurement for dual-connection.

BRIEF DESCRIPTION OF THE DRAWINGS

The present disclosure can be better understood by referring to the following description taken in conjunction with the accompanying drawings. Same or similar reference characters indicate same or similar parts throughout the accompanying drawings. The accompanying drawings are included in the description together with the following specifications as a part of the description for further illustrating preferred embodiments with examples and explaining the principle and advantages of the present disclosure. In the accompanying drawings.

DETAILED DESCRIPTION OF EMBODIMENTS

Embodiments of the invention are described below with reference to the companying drawings. Elements and features described in a companying drawing or an embodiment may be combined with elements and features illustrated in one or more other companying drawings or embodiments in the present disclosure. It should be noted that presentation and explanation of irrelevant components and processes known by those skilled in the art are omitted in the companying drawings and the description for clarity.

The technique according to the present disclosure can be applied to various products. For example, a base station can be implemented as an evolved Node B (eNB) of any types, such as a macro eNB or a small eNB. The small eNB may be an eNB covering a cell smaller than a macro cell, such as a pico-eNB, a micro-eNB, and a home-eNB (femto-eNB). Alternatively, the base station can be implemented as a base station of any other types, such as a NodeB or a base transceiver station (BTS). The base station may include a main body (also referred to as base station equipment) configured to control wireless communications, and one or more remote radio heads (RRH) arranged at positions different from the main body. Furthermore, each of various terminals to be described below may operate as a base station by temporarily or semi-persistently performing functions of a base station.

For example, the electronic apparatus may be implemented as a mobile terminal (such as a smart phone, a tablet personal computer (PC), a laptop PC, a portable game terminal, a portable/dongle mobile router or a digital camera device) or a vehicular terminal (such as a vehicle navigating apparatus). A terminal apparatus 300 can also be implemented as a terminal performing machine-to-machine (M2M) communications (also referred to as a machine-type communication (MTC) terminal). Furthermore, the electronic apparatus 100 may be a wireless communication module (such as an integrated circuit module including a single die) mounted in each of the above terminals.

Figure 1:
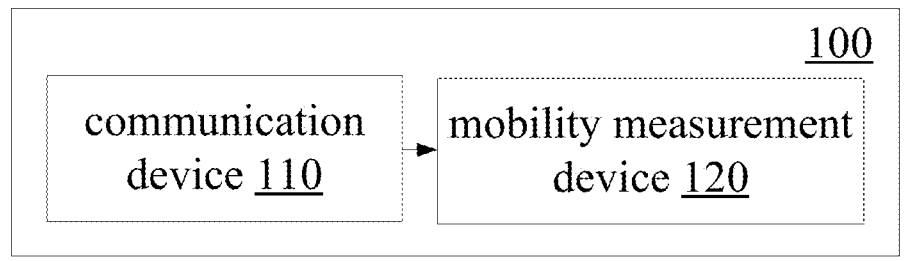
FIG. 1 is a block diagram of a configuration example of an electronic apparatus according to an embodiment of the present disclosure.

Referring to FIG. 1, an electronic apparatus 100 in a wireless communication system according to an embodiment of the present disclosure includes a communication device 110 and a mobility measurement device 120.

The communication device 110 is configured for performing dual-connection communication with two connection nodes respectively via different carriers.

Figure 2:
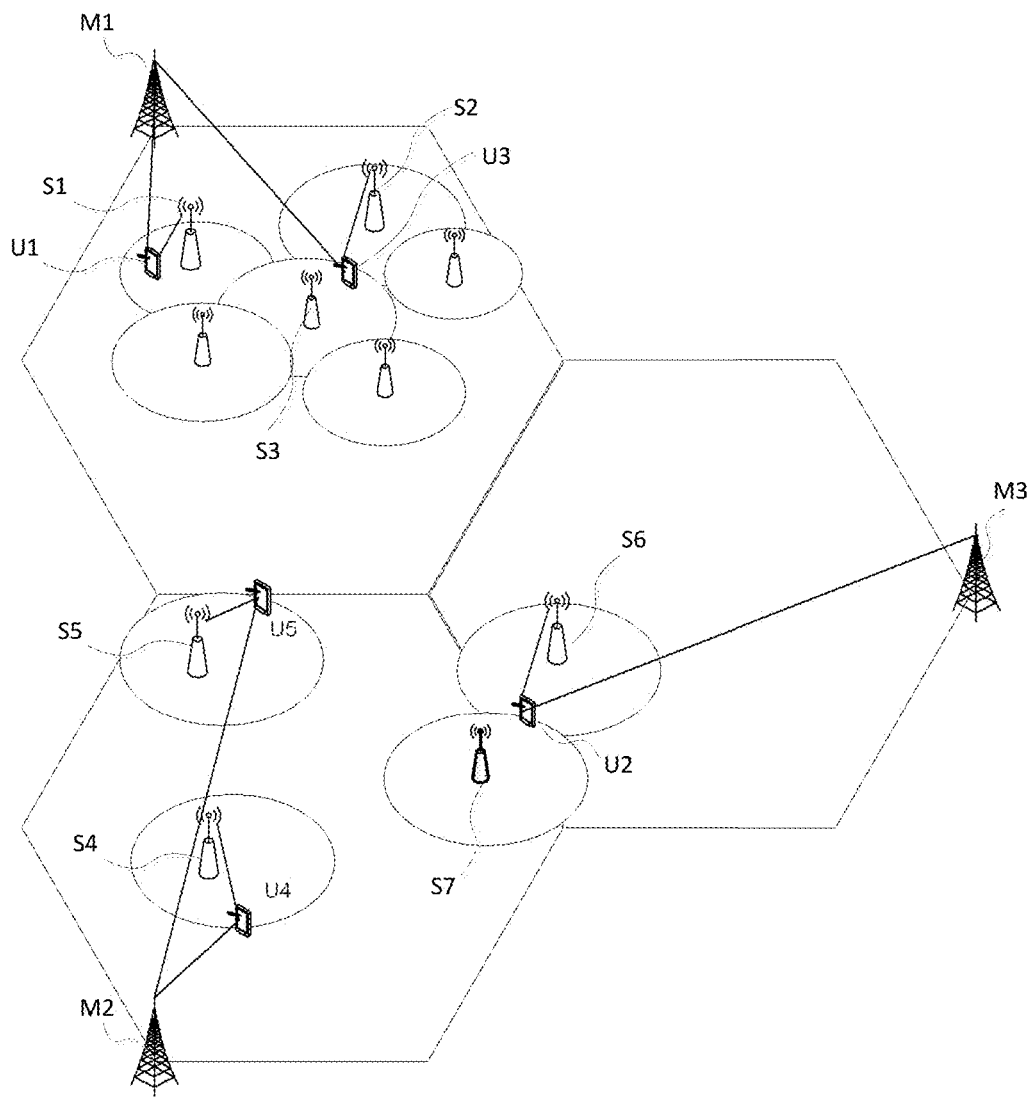
FIG. 2 is a schematic diagram for illustrating connection transfer modes.

For example, as shown in FIG. 2, an electronic apparatus U1 may perform dual-connection communication with two connection nodes M1 and S1 respectively via its communication device.

The mobility measurement device 120 is configured for performing mobility measurement on a connection node of current dual-connection for determining a connection transfer mode, in a case that a service quality of at least one of the current dual-connection nodes is lower than a predetermined level. Furthermore, the mobility measurement device 120 is further configured for determining a mode for reporting a result of the mobility measurement based on a measurement condition of at least one of the current dual-connection nodes.

In the present disclosure, the term "measurement condition" may include the measurement result per se (such as a reference signal received power (RSRP), and a reference signal received quality (RSRQ), etc.), and may also include other measurement conditions, such as whether there is a measurement list for a respective connection node, and a state of a respective started T310 timer and/or TTT timer, etc. As described with reference to specific embodiments below, the mobility measurement device 120 may determine different modes for reporting a result of the mobility measurement based on a measurement condition, so as to improve the efficiency of reporting measurement of dual-connection.

According to an embodiment, the mobility measurement may include mobility measurement configured for determining one of the following connection transfer modes:

Mode A: disconnecting from one of the current dual-connection nodes to change from a dual-connection state into a single-connection state.

Mode B: maintaining connection to one of the current dual-connection nodes, and transferring connection to the other node to a target node, to maintain a dual-connection state.

Mode C: disconnecting from both of the current dual-connection nodes, and transferring connection to a target node, to change from a dual-connection state to a single-connection state.

Mode D: disconnecting from both of the current dual-connection nodes, and transferring connections to two target nodes, to maintain a dual-connection state.

Mode E: maintaining connections to both of the current dual-connection nodes, and adjusting secondary carriers of respective connection nodes.

Examples of the connection transfer modes are described more intuitively below with reference to FIG. 2.

An apparatus U4, which is in a dual-connection with a macro base station M2 and a small cell base station S4, may disconnect from one of the connection nodes, for example, the small cell base station S4, and maintain connection to the other connection node, for example, the macro base station M2. This connection transfer mode corresponds to the above mentioned mode A. In another example, the mode A may also include a case of disconnecting from the macro base station and maintaining connection to the small cell base station.

An apparatus U3, which is in a dual-connection with a macro base station M1 and a small cell base station S2, may disconnect from one of the connection nodes, for example, the small cell base station S2, and transfer to a connect to a small cell base station S3. This connection transfer mode corresponds to the above mentioned mode B. In another example, the mode B may also include a case of transferring connection to a source macro base station to a target macro base station.

An apparatus U5, which is in a dual-connection with the macro base station M2 and a small cell base station S5, may disconnect from both of the macro base station M2 and the small cell base station S5, and transfer to a connect to a macro base station M1. This connection transfer mode corresponds to the above mentioned mode C. In another example, the mode C may also include a case of transferring the original dual-connection to a connection to a target small cell base station.

An apparatus U2, which is in a dual-connection with a macro base station M3 and a small cell base station S6, may disconnect from both of the macro base station M3 and the small cell base station S6, and transfer to a dual-connection to a macro base station M2 and a small cell base station S7. This connection transfer mode corresponds to the above mentioned mode D.

Particularly, for the transfer mode A, no comparison between target nodes is necessary. The transfer may be triggered by, for example, the occurrence of a radio link failure (RLF) over a main carrier of a single node, or a result of mobility measurement of RSRP/RSRQ over a main carrier of the single node being lower than a threshold. For the latter case, a trigger event for the mode A may be distinguished from an E-UTRAN A2 event. For example, a trigger event is defined specially for the mode A.

According to an embodiment, the mobility measurement device 120 may be configured for reporting a mobility measurement result corresponding to the connection transfer of the mode A in a case that a service quality of one of the current dual-connection nodes is lower than a first threshold level. The first threshold level is not higher than a threshold level for triggering an A2 event.

With the above configuration, a condition for triggering an inter-frequency measurement by an A2 event is more permissive than the trigger condition for the connection transfer of the mode A. Therefore, the A2 event may be triggered at a time earlier than the connection transfer of the mode A. The first threshold level may be specifically set as required to appropriately determine an interval between the triggering of the A2 event and the triggering of the connection transfer of the mode A.

More specifically, an offset threshold may be additional defined, on the basis of A2 event, for deactivating one of the connection nodes by a dual-connection user. For example, information on the offset threshold may be broadcasted from the network to terminals. Alternatively, a set of parameters for a dual-connection user to deactivate one of the connection nodes may be broadcasted from the network to terminals with reference to the definition of parameters for the A2 event. By the above two exemplary approaches, a report triggering event may be specially designed for the connection transfer of the mode A, or a manner for reporting the A2 event can be used to carry a condition (such as an RSRP/RSRQ measurement result) for triggering a report of the connection transfer of the mode A, for the network to determine on the deactivation of a node.

In the scenario of dual-connection, if an existing manner of measurement report is used, the triggering of coverage-based measurement is challenged in the following aspects.

Referring to the example as shown in FIG. 2 again, U1 and U3 perform dual-connection data transmission in a supper dense small cells deployment. Adjacent cells may use different bands in order to avoid strong interference between the small cells. In a case that the small cells is far from a macro base station, when a UE moves to an overlapped region between two small cells of different frequencies and performs inter-frequency measurement, the following situation may occur frequently: both a macro cell and a low power node cell satisfy conditions of A3 to A6 events or B1 to B2 events with respect to a target measurement small cell, and the events are reported to the macro cell and/or the low power node respectively. However, since the UE is still in the coverage of the macro cell, the connection to the macro cell needs not to be transferred. Therefore, resources are wasted for unnecessarily reporting mobility measurement for comparing between a serving carrier of the low power node and a serving carrier of the macro base station.

Figure 3:
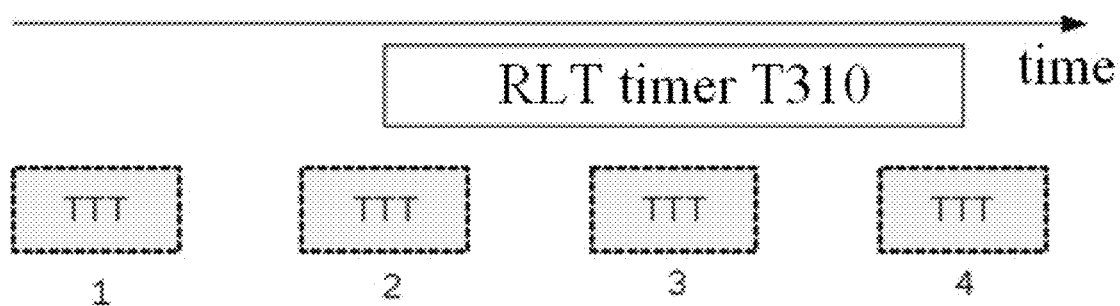
FIG. 3 is a schematic diagram for illustrating an example of time sequence relation between a T310 timer and a TTT timer.

Furthermore, since U5 is at an edge of a macro cell, both a target macro cell (M1) and current dual-connection cells (M2 and S2) satisfy the A3/A5 event. Since U2 is at the edges of two macro cells (M3 and M2) and also the edges of two small cells (S6 and S7), if a source macro cell satisfies an A3/A5 event with respect to both a target macro cell and a target small cell, then the time points for triggering mobility measurement events of main carriers of the two connection nodes of the dual-connection may be different, the connection node transfer operation signaling interaction and data transmission which are performed separately for different reports may be further complicated if the events are reported respectively with a very short time interval. Therefore, it is necessary to define separate trigger events for the scenarios, and simplify the entire operation process for the transmission structure and procedures of user plane data as shown in FIG. 3 for example.

According to an embodiment, the mobility measurement device 120 may be configured for performing mobility measurement on the two connection nodes respectively, and determining the triggering of a mobility measurement report according to a comparison of measurement results on measuring objects for the first node and second node of the current dual-connection nodes, in a case that a predetermined condition is satisfied.

Next, the manner of determining the triggering of a mobility measurement report according to a comparison of measurement results on measuring objects of the current dual-connection nodes is described with reference to a specific embodiment.

In a specific embodiment, the first measuring object for the first node measured by the mobility measurement device 120 may include an inter-frequency inter-system measuring object for the first node and an intra-frequency measuring object for a connection carrier of the first node which are received from the first node. Similarly, the second measuring object for the second node measured by the mobility measurement device 120 may include an inter-frequency inter-system measuring object for the second node and an intra-frequency measuring object for a connection carrier of the second node which are received for the second node. For example, the measurement objects of different connection nodes may be determined according to inter-frequency measurement/inter-system measurement lists for respective nodes.

Accordingly, the mobility measurement device 120 may be configured for performing the mobility measurement based on the first measuring object and the second measuring object respectively, comparing a measurement result of a first measuring object with a measurement result of a second measuring object to determine whether a measurement reporting condition is satisfied, and reporting the measurement result and/or a measurement comparison result of the measuring objects if a carrier of the first node or the second node satisfies the measurement reporting condition. The measurement result and/or the measurement comparison result may be reported only to the node corresponding to the measurement object, or only to a macro node, or to both of the connection nodes.

In the scenario of dual-connection, the network may configure a terminal apparatus to perform inter-frequency measurement on any connection nodes having any carriers that satisfy a condition for reporting the A2 event. On the other hand, an intra-frequency measurement result of a carrier of a first connection node may be considered as an inter-frequency measurement result of a second connection node, and an inter-frequency (inter-system or intra-system) measurement result of the first connection node may also be considered as an inter-frequency measurement result of the second connection node. Similarly, an intra-frequency measurement result of a carrier of the second connection node may be considered as an inter-frequency measurement result of the first connection node, and vice versa. With the embodiment, the measurement result is appropriately reported by referring to the mobility measurement results of both of the connection nodes, which may avoid reporting repeated information in a case that the measurement objects for the two connection nodes include a same target node. Therefore, unnecessary frequent reports of the A3/A4/A5/A6/B1/B2 event can be avoided, thereby the number of triggering of measurement reports in the scenario of dual-connection can be optimized.

According to another specific embodiment, the mobility measurement device 120 may be configured for comparing a measurement result of the first node with a measurement result of the second node to decide whether a triggering condition of an E-UTRAN A3/A4/A5/B1/B2 event is satisfied in a case that the first node satisfies at least one of the following conditions:

1.1) at least one of the first node and the second node satisfies the triggering condition of the A2 event.

1.2) for the first node, there is no measuring object for inter-frequency measurement or inter-system measurement.

1.3) a T310 timer started for a main carrier of the first node exceeds a predetermined time limit and an A3/A4/A5/B1/B2 TTT timer for the first measuring object has not been started yet, or the TTT timer has been started but is turned off within a predetermined time limit.

Here, the measurement result of a node refers to a result of mobility measurement performed for the node, which may include a result of measurement on a signal transmitted by a measuring object (such as the first measurement object) related to the node. As mentioned above, the measuring object of the node may be determined based on information on an inter-frequency inter-system measuring object regarding the node and information on an intra-frequency measuring object for a connection carrier of the node which are received from the node.

Regarding the above condition 1.1), the comparison between the measurement result of the first node and the measurement result of the second node may be performed directly in a case that one of the dual-connection nodes has a service quality lower than a threshold for the A2 event.

Regarding the above condition 1.2), the comparison of measurement results may be performed directly in a case that, for example, one of the dual-connection nodes does not have a mobility measurement list, so that the measurement result of the measuring object of the other node can be used.

Regarding the above condition 1.3), the comparison of measurement results may be performed directly in a case that one of the dual-connection nodes has a high possibility of link failure and there is no candidate target node, so that the measurement result of the measuring object of the other node can be used.

Accordingly, the comparison of measurement results between nodes may be stopped according to a predetermined condition. According to a specific embodiment, the mobility measurement device 120 may be configured for stopping comparison with the measurement result of the second node, and turning off a corresponding A3/A4/A5/B1/B2 TTT timer which has been triggered, the comparison of measurement results of a main carrier of the first node is limited to comparison with frequency points of the first measuring objects, in a case that the first node satisfies at least one of the following conditions:

2.1) a main carrier of the first node satisfies a condition for triggering report of an A1 event; and 2.2) a T310 timer for a main carrier of the first node is turned off before the T310 timer expires, or an A3/A4/A5/B1/B2 TTT timer related to the first measuring object is started before a predetermined time limit expires from the start of the T310 timer, or the TTT timer has been started and operation time of the TTT timer exceeds a predetermined limit.

Regarding the above condition 2.1), since the service quality of the node is recovered, the comparison with measurement result of the other node may be stopped.

Regarding the above condition 2.2), since the possibility of link failure of the node is small or a candidate target node is likely to exist, the comparison with measurement result of the other node may be stopped.

Particularly, according to an embodiment, the mobility measurement device 120 is configured for performing, for mobility measurement corresponding to a connection transfer of the mode E, the mobility measurement and report only for a frequency point contained in a measuring object of inter-frequency measurement or inter-system measurement of each of the current dual-connection nodes, thereby ensuring proper handover to a secondary carrier in the node without unnecessary reporting.

Furthermore, while a TTT timer for a single node is started for triggering a report of a traditional handover event, another channel quality monitoring procedure, i.e., RLF monitoring is also performed. For example, referring to FIG. 3, the TTT timers (for example, TTT timers 1-4) started for individual nodes may have different time relations with a RLF T310 timer. Furthermore, certain time dependency may exist among different nodes, which may be helpful for determining a measurement report corresponding to which mode of transfer to be triggered.

According to an embodiment, the mobility measurement device 12 may be configured for directly triggering a measurement result report and/or measurement comparison result report corresponding to connection transfer of the mode C in a case that a first node of the current dual-connection nodes satisfies a condition for triggering report of the A3/A4/A5/B1/B2 event, and the A3/A4/A5/B1/B2 TTT timer and/or a T310 timer started for a second node of the current dual-connection nodes satisfies a predetermined condition.

In other words, in a case that the first node satisfies a condition of connection transfer, if the timer for the second node satisfies a predetermined condition (such as specific conditions described with reference to specific embodiment below), it is unnecessary to wait for expiration of a timer for the second node to perform the measurement result report corresponding to the connection transfer of the mode C. The report may indicate that the first node satisfies a condition for transferring to a target node and the second node may be disconnected from. Therefore, the system may decide, according to the measurement result, to disconnect from both of the current dual-connection nodes and transfer to the target node, thereby changing from a dual-connection state to a single connection state. With this configuration, the complicity of reporting measurement results may be reduced.

In the following, an example of the above predetermined condition is described with reference to specific embodiments.

According to a specific embodiment, the measurement result report corresponding to the mode C is directly performed if the follow conditions are satisfied:

3.1) the first node first satisfies a condition for triggering report of the A3/A4/A5/B1/B2 event;

3.2) at this time, the expiration-waiting-time of an A3/A4/A5/B1/B2 TTT timer for a main carrier of the second node is less than a predetermined threshold; and 3.3) a measuring target node of the first node is the same as that of the second node.

Herein, the term "expiration-waiting-time" refers to a difference between a current time and an expected expiration time of a timer. In other words, the shorter the expiration-waiting-time is, the closer to the expiration of a timer.

If the above condition 3.1) is satisfied, it is indicated that the first node has an available target node for transfer (which may be an inter-system or intra-system node).

Figure 4:
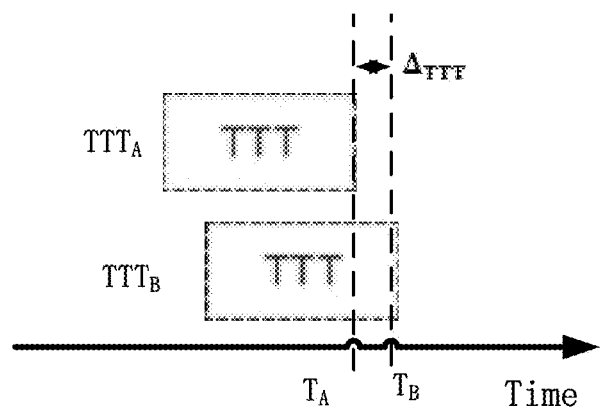
FIG. 4 is a schematic diagram for illustrating an example of time sequence relation between TTT timers.

If the above condition 3.2) is satisfied, it is indicated that the second node is highly possible to have an available target node for transfer. Referring to FIG. 4, the condition 3.2) is satisfied if $T_B - T_A \leq \Delta_{TTT}$, where the current time is the time when a TTT timer $TTT_A$ for the first node is expired (i.e., the time point $T_A$ in FIG. 4), and the expiration-waiting-time of a TTT timer $TTT_B$ for the second node is denoted by $T_B$.

If the above condition 3.3) is satisfied, it is indicated that the connection is to be transferred to the same target node even if the TTT timer for the second node expires.

Therefore, if the above conditions are satisfied, the measurement result report corresponding to the connection transfer of the mode C may be directly performed without waiting for the expiration of the timer for the second node. Therefore, the system may decide, according to the measurement result, to disconnect from both of the current dual-connection nodes and transfer to the target node.

In another embodiment, a measurement result report corresponding to the mode C is directly performed and the report indicates that the target node for transfer is a target node of the first node in a case that the following conditions are satisfied:

4.1) the first node first satisfies a condition for triggering report of an A3/A4/A5/B1/B2 event;

4.2) at this time, the expiration-waiting-time of an A3/A4/A5/B1/B2 TTT timer for a main carrier of the second node is less than a predetermined threshold; and 4.3) at this time, the expiration-waiting-time of a T310 timer for the second node is not greater than that of the TTT timer by a predetermined threshold or more.

If the above condition 4.1) is satisfied, it is indicated that the first node has an available target node for transfer.

Figure 5:
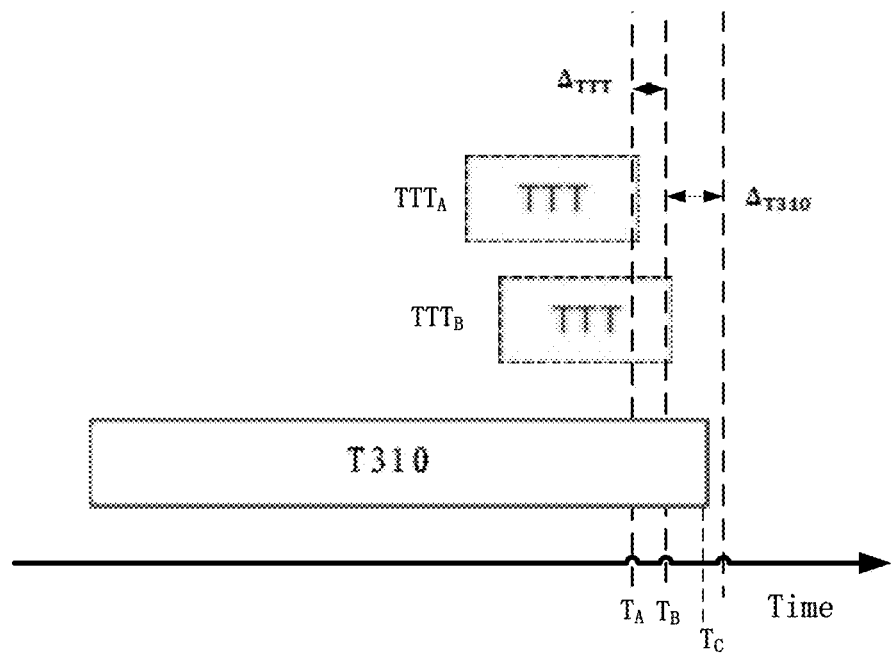
FIG. 5 is a schematic diagram for illustrating an example of time sequence relation between a TTT timer and a T310 timer.

If the above condition 4.2) is satisfied, it is indicated that the second node is highly possible to have an available target node for transfer. Referring to FIG. 5, the condition 4.2) is satisfied if a time $T_A$ when a TTT timer $TTT_A$ for the first node is expired and the expiration-waiting-time $T_B$ of a TTT timer $TTT_B$ for the second node satisfy $T_B - T_A \leq \Delta_{TTT}$.

If the above condition 4.3) is satisfied, it is indicated that even if the TTT time for the second node expires, a link failure is highly possible to occur in a time not sufficient for completing the connection transfer. Referring to FIG. 5, the condition 4.3) is satisfied if $T_C - T_B \leq \Delta_{T310}$, where the expiration-waiting-time of the T310 timer for the second node is denoted as $T_C$.

Therefore, in a case that the above conditions are satisfied, the measurement result report corresponding to the connection transfer of the mode C may be directly performed without waiting for the expiration of the TTT timer or the T310 timer for the second node. Therefore, the system may decide, according to the measurement result, to disconnect from both of the current dual-connection nodes and transfer to the target node.

In another embodiment, a measurement result report corresponding to the mode C is directly performed and the report indicates that the target node for transfer is a target node of the first node, in a case that the following conditions are satisfied:

5.1) the first node first satisfies a condition for triggering report of an A3/A4/A5/B1/B2 event;

5.2) at this time, the expiration-waiting-time of a T310 timer for the second node is less than a predetermined threshold.

If the above condition 5.1) is satisfied, it is indicated that the first node has an available target node for transfer.

Figure 6:
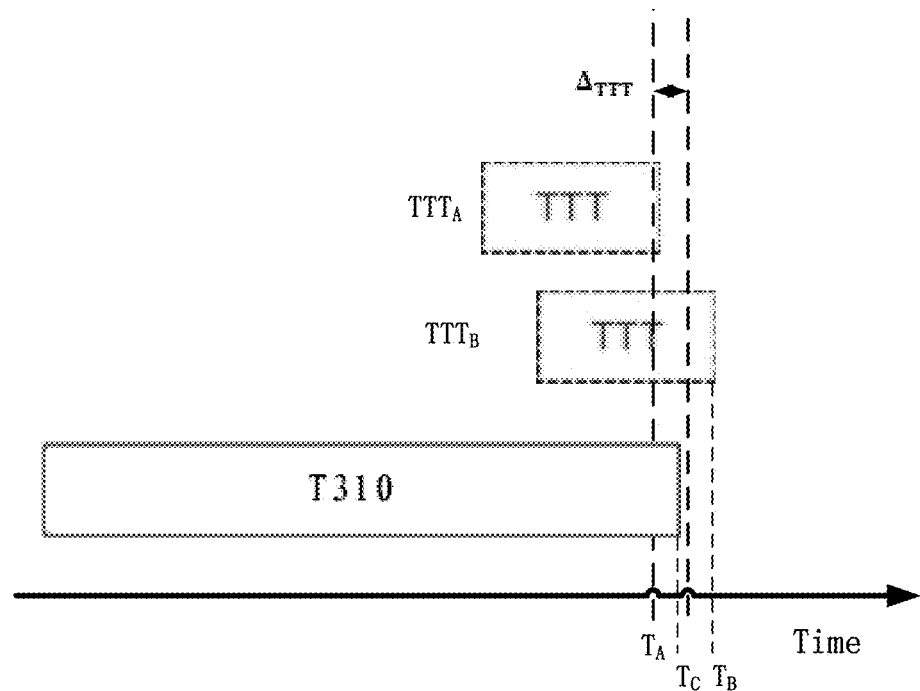
FIG. 6 is a schematic diagram for illustrating an example of time sequence relation between a TTT timer and a T310 timer.

If the above condition 5.2) is satisfied, it is indicated that a link failure is likely to occur to the second node soon. Referring to FIG. 6, the condition 5.2) is satisfied if $T_C - T_A \leq \Delta'_{T310}$, where the expiration-waiting-time of the T310 timer for the second node is denoted as $T_C$.

Therefore, in a case that the above conditions are satisfied, the measurement result report corresponding to the connection transfer of the mode C may be directly performed without wait for the expiration of the TTT timer or the T310 timer for the second node. Therefore, the system may decide, according to the measurement result, to disconnect from both of the current dual-connection nodes and transfer to the target node of the first node.

In the above specific embodiments, the thresholds $\Delta_{TTT}$, $\Delta_{T310}$, $\Delta'_{T310}$ may be set specifically according to requirements. For example, the time thresholds may be set by referring to the time needed for performing the connection transfer, and may be notified to the mobility measurement device by a serving carrier of the connection node via a broadcast message or a dedicated RRC/MAC.

Embodiments of reporting directly without waiting for the expiration of a timer for the second node in a case that the measurement condition satisfies a certain condition are described above. In another embodiment, the mobility measurement device 120 may be configured for waiting for the expiration of an A3/A4/A5/B1/B2 TTT timer for a second node in a case that a first node of the current dual-connection nodes satisfies a condition for triggering report of an A3/A4/A5/B1/B2 event, and the A3/A4/A5/B1/B2 TTT timer started for the second node of the current dual-connection nodes and a T310 timer started for the first node and/or the second node satisfy a predetermined condition.

In other words, in a case that a first node satisfies a condition of connection transfer, if timers of the first node and the second node satisfy a certain condition (such as the condition described below with reference to specific embodiments), the expiration of the timer for the second node is waited for. Therefore, the system can determine the connection transfer mode based on measurement results of both of the nodes. With the embodiment, it can be ensured to determine the connection transfer mode more properly based on measurement result of both the nodes in certain cases.

According to a specific embodiment, the expiration of a TTT timer for the second node is waited for in a case that the condition for triggering the report of an A3/A4/A5/B1/B2 event is satisfied for the first node and the following conditions are satisfied:

6.1) the expiration-waiting-time of the A3/A4/A5/B1/B2 TTT timer started for a main carrier of the second node is less than a predetermined threshold; and 6.2) the expiration-waiting-time of the T310 timer started for the first node and/or the second node is greater than the expiration-waiting-time of the TTT timer for the second node by a predetermined threshold or more.

Figure 7:
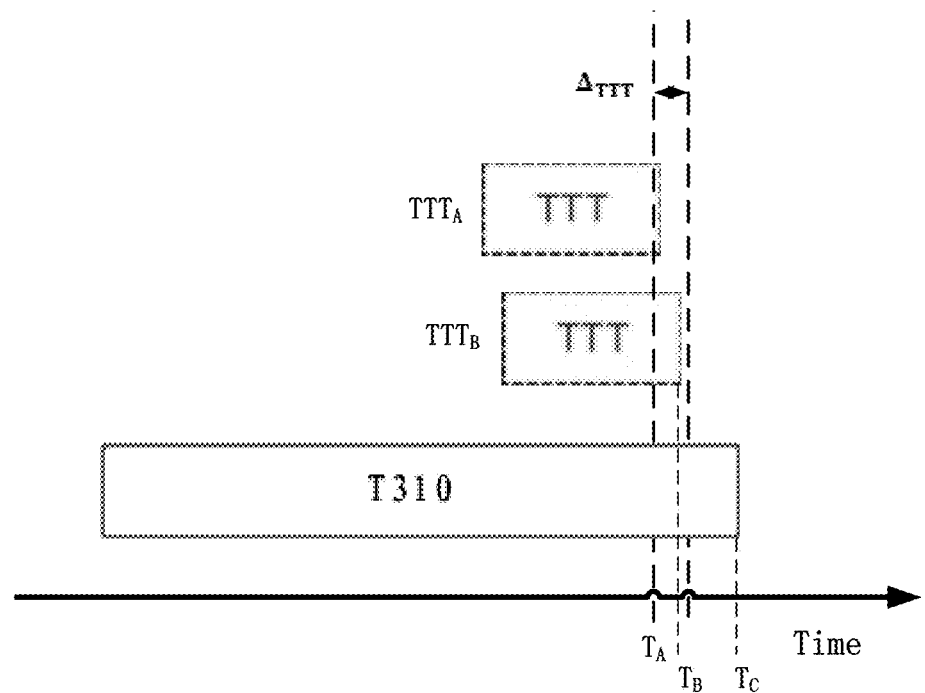
FIG. 7 is a schematic diagram for illustrating an example of time sequence relation between a TTT timer and a T310 timer.

If the above condition 6.1) is satisfied, it is indicated that the second node is highly possible to have an available target node for transfer. For example, referring to FIG. 7, the condition 6.1) is satisfied because the expiration time $T_A$ of the timer $TTT_A$ for the first node and the expiration-waiting-time $T_B$ of the TTT timer $TTT_B$ for the second node satisfy the condition $T_B - T_A \leq \Delta_{TTT}$.

If the above condition 6.2) is satisfied, it is indicated that a link failure will not occur soon to the first node and/or the second node. For example, referring to FIG. 7, the condition 6.2) is satisfied because the expiration time Tc of a T310 timer (which may be started for the first node and/or the second node) satisfies the condition $T_C - T_B \leq \Delta_{TTT}$.

Furthermore, in a case that the above conditions for waiting for the expiration of a TTT timer for the second node are satisfied, if the TTT timer for the second node is turned off due to a fact that the channel quality of the second node is recovered during the waiting for the expiration of the TTT timer, the measurement result report corresponding to the mode B may be performed for the measurement triggering event of the first node.

In other words, in a case that the first node satisfies the condition of connection transfer, if the service quality of the second node is recovered, the report may indicate that the first node satisfies a condition for transferring to the target mode and connection to the second node may be maintained. Therefore, the system may decide, according to the measurement result, to maintain the connection to the second node of the current dual-connection nodes and transfer the connection to the first node to connection to the target node of the first node, thereby maintaining a dual-connection state.

Furthermore, in a case that the above conditions for waiting for the expiration of a TTT timer for the second node are satisfied, if the TTT timer for the second node expires, corresponding reporting manners can be determined based on the following measurement conditions:

7.1) in a case that target nodes of TTT events for main carrier measurement of the first node and the second node are different, a measurement result report corresponding to the mode D is performed, or a measurement result report corresponding to the mode C is performed with a target node of a macro node serving as the target node for transfer.

7.2) in a case that target nodes of TTT events for main carrier measurement of the first node and the second node are the same, performing a measurement result report corresponding to the mode C.

Regarding the case 7.1), since the two nodes have different available target nodes for transfer, the report may indicate that each of the first node and the second node satisfies a condition for transferring to a respective target node. The system may decide, according to the measurement result, to disconnect from both of the dual-connection nodes, and transfer to the two target nodes, thereby maintaining a dual-connection state. Alternatively, the system may decide, according to the measurement result, to disconnect from both of the dual-connection nodes, and transfer to a target node of a macro node, thereby maintaining a single-connection state.

Regarding the above case 7.2), since the two nodes have the same available target node for transfer, the report may indicate that both the first node and the second node satisfy the condition for transferring to the same target node. Therefore, the system may decide, according to the measurement result, to disconnect from both of the current dual-connection nodes and transfer to the target node, thereby changing from a dual-connection state to a single-connection state.

Furthermore, according to an embodiment, the condition for waiting for the expiration of the TTT timer for the second node may further include: the measurement trigger reporting event for the second node is a coverage-based mobility trigger reporting event. In other words, it is required that the measurement on the second node is coverage-based mobility measurement for waiting for the expiration of the TTT timer for the second node after the expiration of the TTT timer for the first node, while the measurement of the first node may be coverage-based mobility measurement or load-based mobility measurement. With this configuration, it is avoid that a report of coverage-based measurement waits for a report of load-based measurement, thereby having a more reasonable mobility measurement reporting manner.

In addition to the above measurement conditions described with reference to the above embodiments, there may be another condition that both of the dual-connection nodes satisfy a condition for triggering a report. According to an embodiment, the mobility measurement device 120 may be configured for, in a case that main carriers of both of the current dual-connection nodes satisfy a condition for triggering report of an A3/A4/A5/B1/B2 event, not transferring the connection to the two nodes, but performing a measurement result report corresponding to the mode B according to a priority order, or performing a measurement result report corresponding to the mode D in order to decide a preferred transferring node by the network. In other words, the report may indicate that one of the nodes satisfies the condition for transferring to the target node, and connection to the other node may be maintained. Therefore, the system may decide, according to the measurement result, to maintain connection to which one of the current dual-connection nodes and transfer the connection to the other node to a target node, thereby maintaining a dual-connection state. For the other node, measurement result of the other node may be reported after a certain time or after receipt of a node transferring command from the network. This configuration is advantageous for reducing the complicity of measurement report.

Specifically, the priority order may be determined according to one or more of the following principles:

8.1) the one having a worse channel quality of source node is prior;

8.2) the one having a better signal of target node is prior;

8.3) a coverage-based measurement event is prior to a load-based measurement event;

8.4) a node whose T310 timer expires earlier is prior; and 8.5) a macro node is prior to a low power node.

With the principles 8.1) and 8.2), the transfer mode is selected according to channel quality, which may achieve better channel quality by the node transfer. With the principles 8.3) and 8.5), it is ensured that more important node has higher priority to be transferred. With the principle 8.4), it is ensured that a node that is more likely to have link failure has higher priority to be transferred. With this configuration, the report may be performed according to the channel quality or the importance of nodes, thereby having a more reasonable mobility measurement reporting manner.

Furthermore, considering that a macro node is mainly for maintaining the network connection and a low power node is mainly for data distribution, preferably, load-based measurement report can be performed mainly for a low power node and coverage-based measurement report can be performed for both of the connection nodes.

Therefore, according to an embodiment, the mobility measurement device 120 is configured for reporting a load-based event only for a low power node.

Particularly, in a case that a measurement report corresponding to the connection transfer mode C and the connection transfer mode D (i.e., disconnecting from both of dual-connection nodes and transferring the connection to one or more target nodes) occurs in various temporal relations combinations, the mobility measurement device 120 may be configured for reporting a new report triggering event or reporting by combining traditional A3/A4/A5/B1/B2 events. Furthermore, the mobility measurement device 120 may report in various manners. For example, it is possible to report measurement results of connection nodes to respective connection nodes (i.e., to report measurement result of the first node to the first node and report measurement result of the second node to the second node), or report measurement results of all connection nodes to both of the connection nodes (i.e., to report measurement results of the first and second nodes to both of the first and second node). Furthermore, it is possible to report measurement results of both nodes only to a macro node, or report measurement results of both nodes to the macro node while reporting a measurement result of a main carrier of a low power node to the low power node, as will be described with reference to FIG. 8 to FIG. 11 below.

According to an embodiment, the mobility measurement device 120 is configured for, if radio link failure occurs to a node of the current dual-connection nodes before receipt of a node transfer notice and a node transfer event report is performed for the node, reporting to the network via the other node of the current dual-connection nodes after waiting for over a predetermined time limit, and waiting for transfer notice signaling sent from the network via the other node within the time limit. Alternatively, report can be made directly to the other node, and node transfer operation is made based on a notice from the other node.

Furthermore, the node for reporting a measurement result and receiving a confirmation for connection transfer may be determined according to a state of a T310 timer or TTT timer started for a connection node.

According to an embodiment, the mobility measurement device 120 may be configured for sending a measurement report and receiving a confirmation for connection transfer via a first node and/or a second node of the current dual-connection nodes, that is, sending a measurement report and receiving a confirmation for connection transfer via any one or both of the two nodes, in the following case:

9.1) the expiration-waiting-times of T310 timers for the first node and the second node are both greater than a predetermined threshold; or 9.2) for the first node and the second node, the expiration-waiting-time of a T310 timer is greater than that of a TTT timer by a predetermined threshold or more.

As mentioned above, the expiration-waiting-time is a difference between a current time and an expected expiration time of a timer. Below, it is assumed that the current time is the expiration time of the TTT timer for the first node, and $T310_A$ denotes the expiration-waiting-time of the T310 timer for the first node, $T310_B$ denotes the expiration-waiting-time of the T310 timer for the second node, and $TTT_B$ denotes the expiration-waiting-time of the TTT timer for the second node.

If the conditions in the case 9.1) are satisfied, that is, $T310_A \geq \Delta_A$ and $T310_B \geq \Delta_B$, it is indicated that no link failure will occur soon to any of the two connection nodes. Therefore, the sending of a measurement report and reception of a confirmation for connection transfer may be performed by any one or both of the connection nodes.

If the conditions in the case 9.2) are satisfied, that is, $T310_A - TTT_B \geq \Delta'_A$ and $T310_B - TTT_B \geq \Delta'_B$, it is indicated that there may be sufficient time between the determination of available target node for transfer and occurrence of link failure. Therefore, the sending of a measurement report and reception of a confirmation for connection transfer may be performed by any one or both of the connection nodes.

In another embodiment, the mobility measurement device 120 may be configured for sending a measurement report and receiving a confirmation for connection transfer via a first node of the current dual-connection nodes in the following case:

10.1) the expiration-waiting-time of a T310 timer for the first node is greater than a predetermined threshold, and the expiration-waiting-time of a T310 timer for a second node of the current dual-connection nodes is less than a predetermined threshold; or 10.2) for the first node, the expiration-waiting-time of a T310 timer is greater than that of a TTT timer by a predetermined threshold or more, and for the second node, the expiration-waiting-time of a T310 timer is not greater than that of a TTT timer by a predetermined threshold or more.

If the conditions in the case 10.1) are satisfied, that is, $T310_A \geq \Delta_A$ and $T310_B < \Delta_B$, it is indicated that no link failure will occur soon to the first nodes, while a link failure may likely occur soon to the second node. Therefore, the sending of a measurement report and reception of a confirmation for connection transfer may be performed by the first nodes.

If the conditions in the case 10.2) are satisfied, that is, $T310_A - TTT_B \geq \Delta'_A$ and $T310_B - TTT_B < \Delta'_B$, it is indicated that there may be sufficient time between the determination of available transfer target node and occurrence of link failure for the first node, while there may not be sufficient time between the determination of available transfer target node and occurrence of link failure for the second node. Therefore, the sending of a measurement report and reception of a confirmation for connection transfer may be performed by the first node.

Similarly, the mobility measurement device 120 may be configured for sending a measurement report and receiving a confirmation for connection transfer via the second node of the current dual-connection nodes in the following case:

11.1) the expiration-waiting-time of a T310 timer for the second node is greater than a predetermined threshold, and the expiration-waiting-time of a T310 timer for the first node of the current dual-connection nodes is less than a predetermined threshold; or 11.2) for the second node, the expiration-waiting-time of a T310 timer is greater than that of a TTT timer by a predetermined threshold or more, and for the first node, the expiration-waiting-time of a T310 timer is not greater than that of a TTT timer by a predetermined threshold or more.

In another embodiment, the mobility measurement device 120 may be configured for sending a measurement report or receiving a confirmation for connection transfer via both of a first node and a second node of the current dual-connection nodes in the following case:

12.1) the expiration-waiting-times of T310 timers of the first node and the second node are both less than a predetermined threshold; or 12.2) for the first node and the second node, the expiration-waiting-time of a T310 timer is not greater than that of a TTT timer by a predetermined threshold or more.

If the conditions in the case 12.1) are satisfied, that is, $T310_A < \Delta_A$ and $T310_B < \Delta_B$, it is indicated that a link failure may occurs soon to both of the connection nodes. Therefore, the sending of a measurement report and reception of a confirmation for connection transfer need to be performed by both of the nodes, to improve the possibility of success in signaling transmission.

If the conditions in the case 12.2) are satisfied, that is, $T310_A - TTT_B < \Delta'_A$ $T310_B - TTT_B \geq \Delta'_B$, it is indicated that there may not be sufficient time between the determination of available transfer target node and occurrence of link failure. Therefore, the sending of a measurement report and reception of a confirmation for connection transfer also need to be performed by both of the nodes, to improve the possibility of success in signaling transmission.

In the above embodiments, the time thresholds, such as, the thresholds $\Delta_A$, $\Delta_B$, $\Delta'_A$, $\Delta'_B$, may be set according to practical conditions. For example, the time threshold may be set by referring to a time needed for performing the connection transfer, to ensure a predetermined probability of success in signaling transmission. The thresholds are notified to the mobility measurement device by the serving carrier of the connection node via a broadcast message or dedicated RRC/MAC.

The scenarios may be reported separately or may be reported as a type of scenarios that may be processed with a same principle (such as the 4 cases classified as the above). Specifically, if the cases are represented with a 0/1 bitmap, the number of added information bits is the number of the cases. If the added information bits are represented in the binary, the added information is 4 bits or 2 bits. Accordingly, the network may perform a process control according to the time sequences corresponding to the cases.

Figure 8:
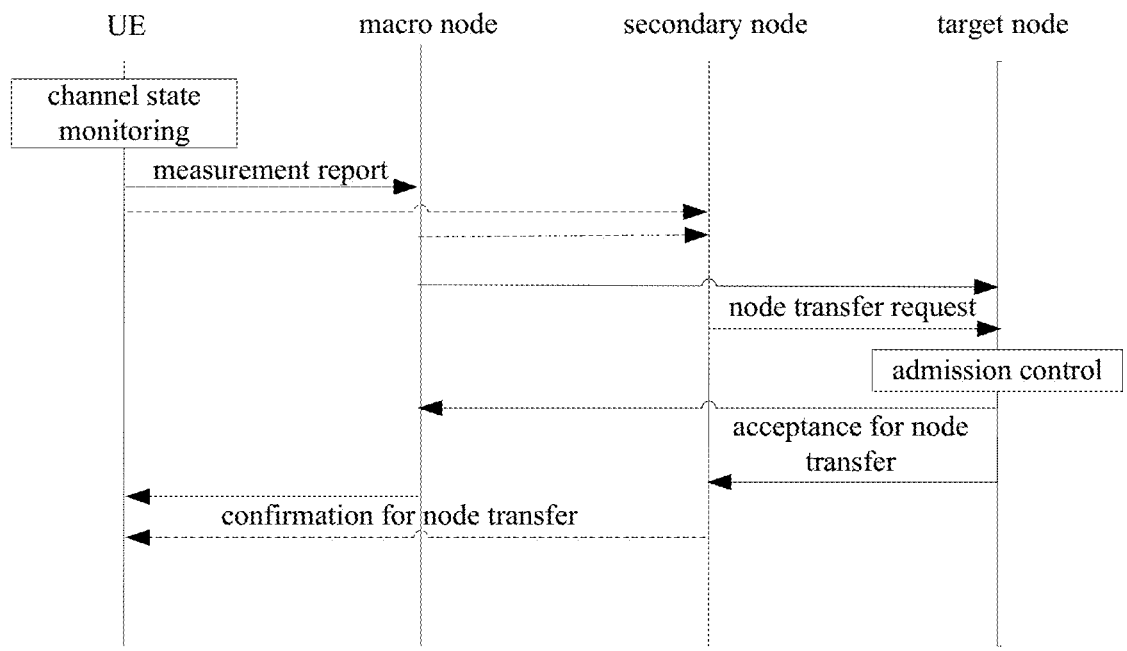
FIG. 8 is a schematic diagram for illustrating an exemplary manner of signaling transmission for connection node transfer.
Figure 9:
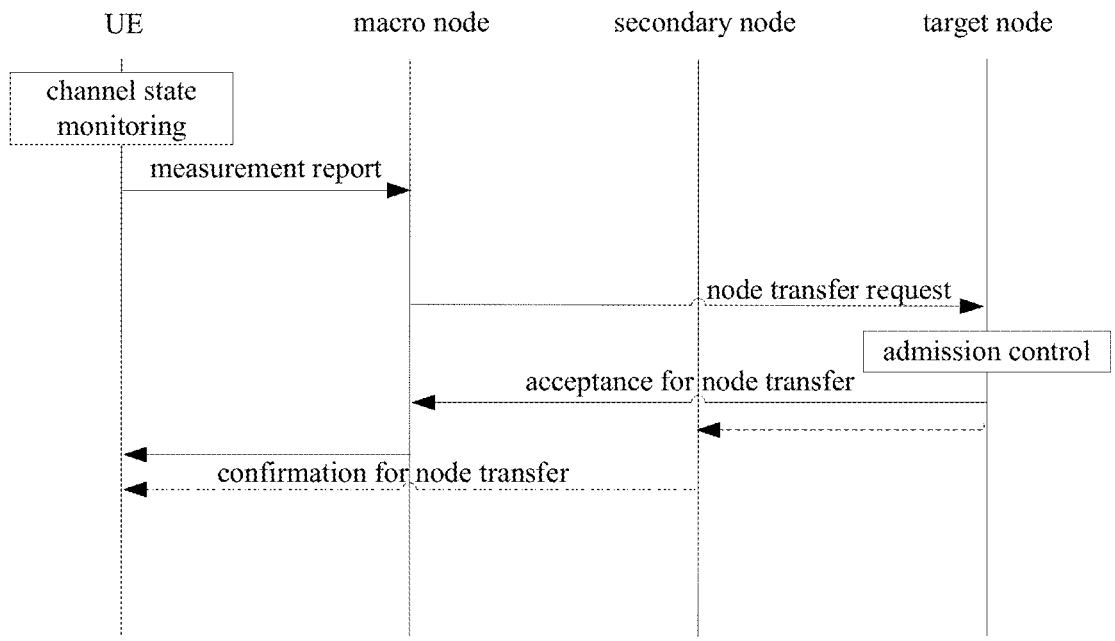
FIG. 9 is a schematic diagram for illustrating an exemplary manner of signaling transmission for connection node transfer.
Figure 10:
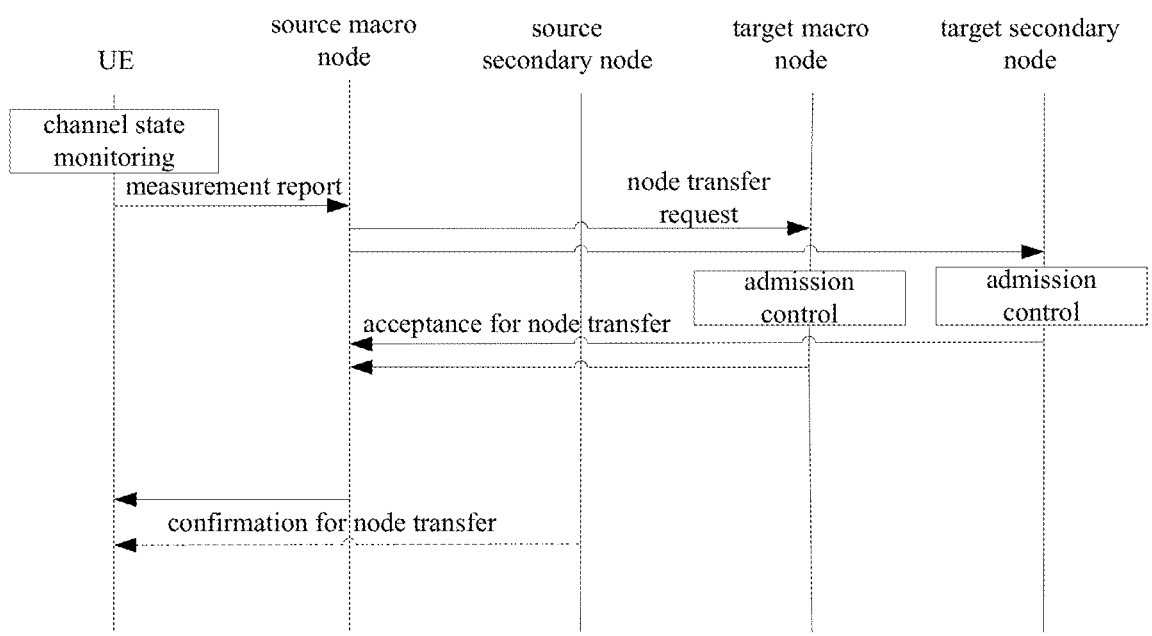
FIG. 10 is a schematic diagram for illustrating an exemplary manner of signaling transmission for connection node transfer.
Figure 11:
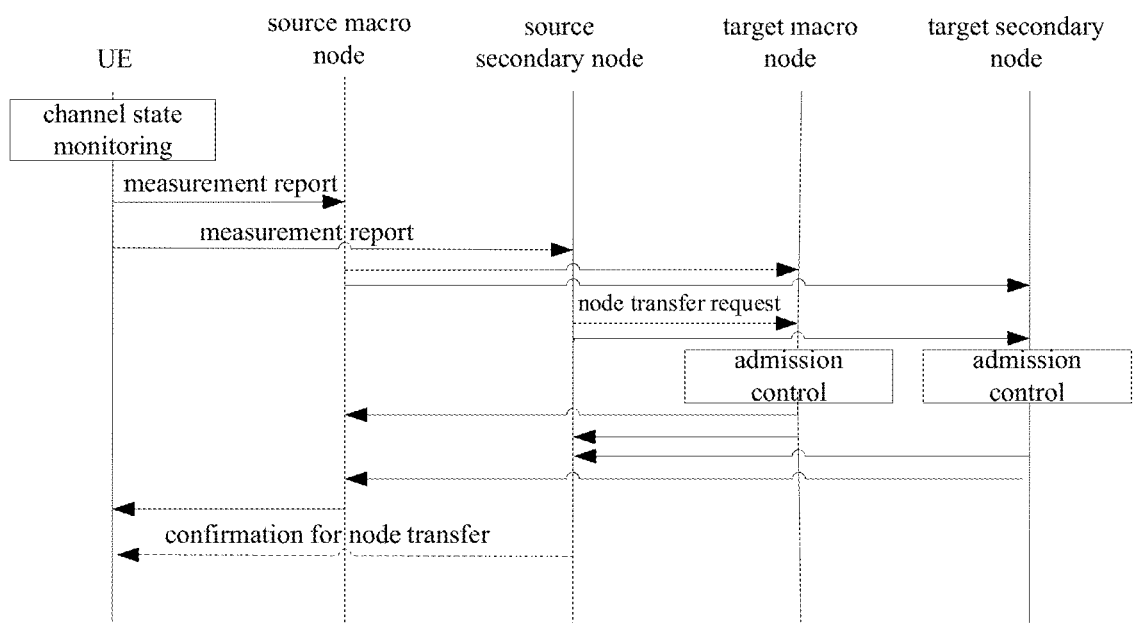
FIG. 11 is a schematic diagram for illustrating an exemplary manner of signaling transmission for connection node transfer.

Next, exemplary signaling transmission for transferring connection nodes are described with reference to FIG. 8 to FIG. 11. FIG. 8 and FIG. 9 correspond to the connection transfer mode C (i.e., the mode of disconnecting from both of the dual-connection nodes and transferring connection to one target node). FIG. 10 and FIG. 11 correspond to the connection transfer mode D (i.e., the mode of disconnecting from both of the dual-connection nodes and transferring connection to two target nodes).

Referring to FIG. 8, a UE may send a measurement report to a macro node based on a result of channel state monitoring. Furthermore, referring to the conditions (for example, 9.1) or 9.2), 12.1) or 12.2)) described above, the UE may send the measurement report to a secondary node. Additionally, the macro node may send the received measurement report to the secondary node.

Then, a node transfer request may be sent to a target node by the macro node and/or the secondary node. If the request is approved, the target node sends acceptance signaling to the macro node and/or the secondary node, and then the macro node and/or the secondary node sends a confirmation for node transfer to the UE.

Referring to FIG. 9, for example, referring to the conditions (for example, 10.1) or 10.2), 11.1) or 11.2)) described above, a UE may send a measurement report only to a macro node based on a result of channel state monitoring.

Then, a node transfer request may be sent to a target node by the macro node. If the request is approved, the target node sends acceptance signaling to the macro node, and the macro node sends a confirmation for node transfer to the UE.

It should be noted that, although FIG. 9 illustrates that the measurement report and the confirmation for node transfer are sent by the macro node, the measurement report and the confirmation for node transfer may also be sent by the secondary node if the secondary node satisfies a corresponding condition.

Referring to FIG. 10, for example, referring to the conditions (for example, 10.1) or 10.2), 11.1) or 11.2)) described above, a UE may send a measurement report to a source macro node based on a result of channel state monitoring.

Then, a node transfer request may be sent to a target macro node and a target secondary node by the source macro node. If the request is approved, the target macro node and the target secondary node send acceptance signaling to the source macro node, and then the source macro node sends a confirmation for node transfer to the UE.

Although FIG. 10 illustrates that the measurement report and the confirmation for node transfer are sent by the source macro node, the measurement report and the confirmation for node transfer may also be sent by the source secondary node if the source secondary node satisfies a corresponding condition.

Referring to FIG. 11, for example, referring to the conditions (for example, 9.1) or 9.2), 12.1) or 12.2)) described above, a UE may send a measurement report to a source macro node and a source secondary node based on a result of channel state monitoring.

Then, a node transfer request may be sent to a target macro node and a target secondary node by the source macro node and the source secondary node. If the request is approved, the target macro node and the target secondary node send acceptance signaling to the source macro node and the source secondary node, and the source macro node and the source secondary node send a confirmation for node transfer to the UE.

Apparently, the above description of the embodiments of the electronic apparatus also discloses some processing and methods. A summary of the methods is provided below without repeating some details discussed above.

Figure 12:
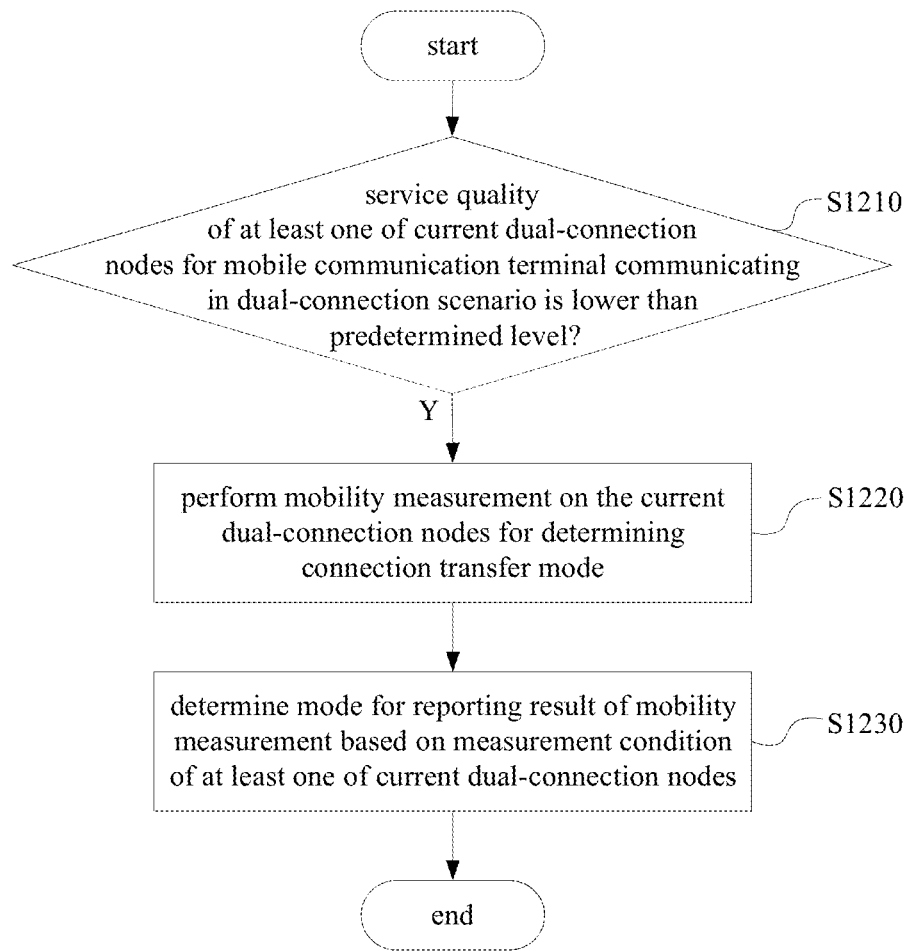
FIG. 12 is a flowchart of a process example of a method according to another embodiment of the present disclosure.

Referring to FIG. 12, a method of performing mobility measurement by a mobile communication terminal according to an embodiment of the present disclosure includes:

performing (S1220) mobility measurement on current dual-connection nodes for determining a connection transfer mode in a case that a service quality of at least one of the current dual-connection nodes for the mobile communication terminal communicating in a dual-connection scenario is lower than a predetermined level (Y in S1210); and determining (1230) a mode for reporting a result of the mobility measurement based on a measurement condition of at least one of the current dual-connection nodes.

The connection transfer mode may include at least one of the connection transfer modes A to E described above.

According to an embodiment, a mobility measurement result corresponding to the connection transfer of the mode A is reported in a case that a service quality of one of the current dual-connection nodes is lower than a first threshold level. The first threshold level is lower than a threshold level for triggering an E-UTRAN A2 event.

In another embodiment, the triggering of a mobility measurement report is determined according to a comparison of measurement results for the first connection node and second connection node of the current dual-connection nodes, in a case that a predetermined condition is satisfied.

Specifically, the first measuring object for the first node may include an inter-frequency inter-system measuring object for the first node and an intra-frequency measuring object for a connection carrier of the first node which are received from the first node; and the second measuring object for the second node may include an inter-frequency inter-system measuring object for the second node and an intra-frequency measuring object for a connection carrier of the second node which are received for the second node.

The mobility measurement may be performed on the first measuring object and the second measuring object respectively, and a measurement result of the measuring object for the first node may be compared with a measurement result of the measuring object for the second node to determine whether a measurement reporting condition is satisfied. The measurement result of the measuring object of the second node is reported to the first node if a condition for reporting the measurement result to the first node is satisfied.

Furthermore, a measurement result of the first node may be compared with a measurement result of the second node to decide whether a triggering condition of an E-UTRAN A3/A4/A5/B1/B2 event is satisfied in a case that the first node satisfies at least one of the following conditions: at least one of the first node and the second node satisfies the triggering condition of the A2 event; for the first node, there is no measuring object for inter-frequency measurement or inter-system measurement; and a T310 timer started for a main carrier of the first node exceeds a predetermined time limit and an A3/A4/A5/B1/B2 TTT timer for the first measuring object has not been started yet, or the TTT timer has been started but is turned off within a predetermined time limit.

Furthermore, the comparison with the measurement result of the second node may be stopped, a corresponding A3/A4/A5/B1/B2 TTT timer which has been triggered may be turned off, and the comparison of measurement results of a main carrier of the first node may be limited to comparison with frequency points of the first measuring objects, in a case that the first node satisfies at least one of the following conditions: a main carrier of the first node satisfies a condition for triggering report of an A1 event; and a T310 timer for the main carrier of the first node is turned off before the T310 timer expires or an related A3/A4/A5/B1/B2 TTT timer is started before a predetermined time limit expires from the start of the T310 timer, or the TTT timer has been started and operation time of the TTT timer exceeds a predetermined limit.

According to an embodiment, for mobility measurement corresponding to a connection transfer of the mode E, the mobility measurement and report are performed only for a frequency point contained in a measuring object of inter-frequency measurement or inter-system measurement of the current dual-connection nodes.

In another embodiment, a mobile terminal directly performs a measurement result report corresponding to the mode C in a case that a first node of the current dual-connection nodes satisfies a condition for triggering report of an A3/A4/A5/B1/B2 event, and an A3/A4/A5/B1/B2 TTT timer and/or a T310 timer started for a second node of the current dual-connection nodes satisfies a predetermined condition.

Specifically, a measurement result report corresponding to the mode C may be directly performed in a case that the following conditions are satisfied: the first node first satisfies a condition for triggering report of the A3/A4/A5/B1/B2 event; meanwhile the expiration-waiting-time of an A3/A4/A5/B1/B2 TTT timer for a main carrier of the second node is less than a predetermined threshold; and a measuring target node of the first node is the same as that of the second node.

Furthermore, a measurement result report corresponding to the mode C may be directly performed and it is indicated that the target node for transfer is a target node of the first node in a case that the following conditions are satisfied: the first node first satisfies a condition for triggering report of an A3/A4/A5/B1/B2 event; meanwhile the expiration-waiting-time of an A3/A4/A5/B1/B2 TTT timer for a main carrier of the second node is less than a predetermined threshold; and meanwhile the expiration-waiting-time of a T310 timer for the second node is not greater than that of the TTT timer by a predetermined threshold or more.

Furthermore, a measurement result report corresponding to the mode C may be directly performed and it is indicated that the target node for transfer is a target node of the first node in a case that the following conditions are satisfied: the first node first satisfies a condition for triggering report of an A3/A4/A5/B1/B2 event; meanwhile the expiration-waiting-time of an A3/A4/A5/B1/B2 TTT timer for a main carrier of the second node is greater than a predetermined threshold; and meanwhile the expiration-waiting-time of a T310 timer for the second node is less than a predetermined threshold.

According to an embodiment, a mobile communication terminal waits for the expiration of an A3/A4/A5/B1/B2 TTT timer for a second node in a case that a first node of the current dual-connection nodes satisfies a condition for triggering report of an A3/A4/A5/B1/B2 event, and the A3/A4/A5/B1/B2 TTT timer started for the second node of the current dual-connection nodes and a T310 timer started for the first node and/or the second node satisfy a predetermined condition.

More specifically, the expiration of the TTT timer for the second node may be waited for in a case that the condition for triggering the report of an A3/A4/A5/B1/B2 event is satisfied for the first node and the following conditions are satisfied: the expiration-waiting-time of the A3/A4/A5/B1/B2 TTT timer started for a main carrier of the second node is less than a predetermined threshold; the expiration-waiting-time of the T310 timer started for the first node and/or the second node is greater than the expiration-waiting-time of the TTT timer for the second node by a predetermined threshold or more.

More specifically, a measurement result report corresponding to the mode B is performed for the measurement triggering event of the first node if the TTT timer for the second node is turned off because the channel quality of the second node is recovered during the waiting for the expiration of the TTT timer.

Furthermore, if the TTT timer for the second node expires: a measurement result report corresponding to the mode D is performed in a case that target nodes of TTT events for main carrier measurement of the first node and the second node are different; a measurement result report corresponding to the mode C is performed in a case that target nodes of TTT events for main carrier measurement of the first node and the second node are the same.

Furthermore, the condition for waiting for the expiration of the TTT timer for the second node may also include: the measurement trigger reporting event for the second node is a coverage-based mobility trigger reporting event.

In another embodiment, in a case that main carriers of both of the current dual-connection nodes satisfy a condition for triggering report of an A3/A4/A5/B1/B2 event, a priority order for reporting may be determined based on one or more of the following principles: the one having a worse channel quality of source node is prior; the one having a better signal of target node is prior; a coverage-based measurement event is prior to a load-based measurement event; a node whose T310 timer expires earlier is prior; and a macro node is prior to a low power node.

Preferably, a load-based event may be reported only for a low power node.

According to an embodiment, if radio link failure occurs to one of the current dual-connection nodes before receipt of a node transfer notice, one of the following rules are followed to operate: reporting to the network via the other node of the current dual-connection nodes after waiting for over a predetermined time limit, and waiting for transfer notice signaling sent from the network via the other node within the time limit; and directly reporting to the other node, and performing node transfer operation based on a notice from the other node.

In another embodiment, the sending of a measurement report to and reception of a confirmation for connection transfer are performed via a first node and/or a second node of the current dual-connection nodes in a case that: the expiration-waiting-times of T310 timers for the first node and the second node are both greater than a predetermined threshold; or for the first node and the second node, the expiration-waiting-time of a T310 timer is greater than that of a TTT timer by a predetermined threshold or more.

In another embodiment, the sending of a measurement report to and reception of a confirmation for connection transfer are performed via a first node of the current dual-connection nodes in a case that: the expiration-waiting-time of a T310 timer for the first node is greater than a predetermined threshold, and the expiration-waiting-time of a T310 timer for a second node of the current dual-connection nodes is less than a predetermined threshold; or for the first node, the expiration-waiting-time of a T310 timer is greater than that of a TTT timer by a predetermined threshold or more, and for the second node, the expiration-waiting-time of a T310 timer is not greater than that of a TTT timer by a predetermined threshold or more.

In another embodiment, the sending of a measurement report to and reception of a confirmation for connection transfer are performed via both a first node and a second node of the current dual-connection nodes in a case that: the expiration-waiting-times of T310 timers of the first node and the second node are both less than a predetermined threshold; or for the first node and the second node, the expiration-waiting-time of a T310 timer is not greater than that of a TTT timer by a predetermined threshold or more.

As an example, various steps of the above methods and various components and/or units of the above device may be implemented in software, firmware, hardware or a combination thereof. In a case of implementing in software or firmware, a program of a software for implementing the above methods may be installed from a storage medium or a network to a computer (such as the general-purpose computer 1300 shown in FIG. 13) having dedicated hardware structure. The computer can perform various functions if installed with various programs. In a case of implementing the above device in software, the device may be configured by a software design. In a case of implementing the above device in hardware, the device may be configured by a hardware design or combination. In a case of implementing the above device in a combination of software and hardware, the device may be configured by a design combining software and hardware.

Figure 13:
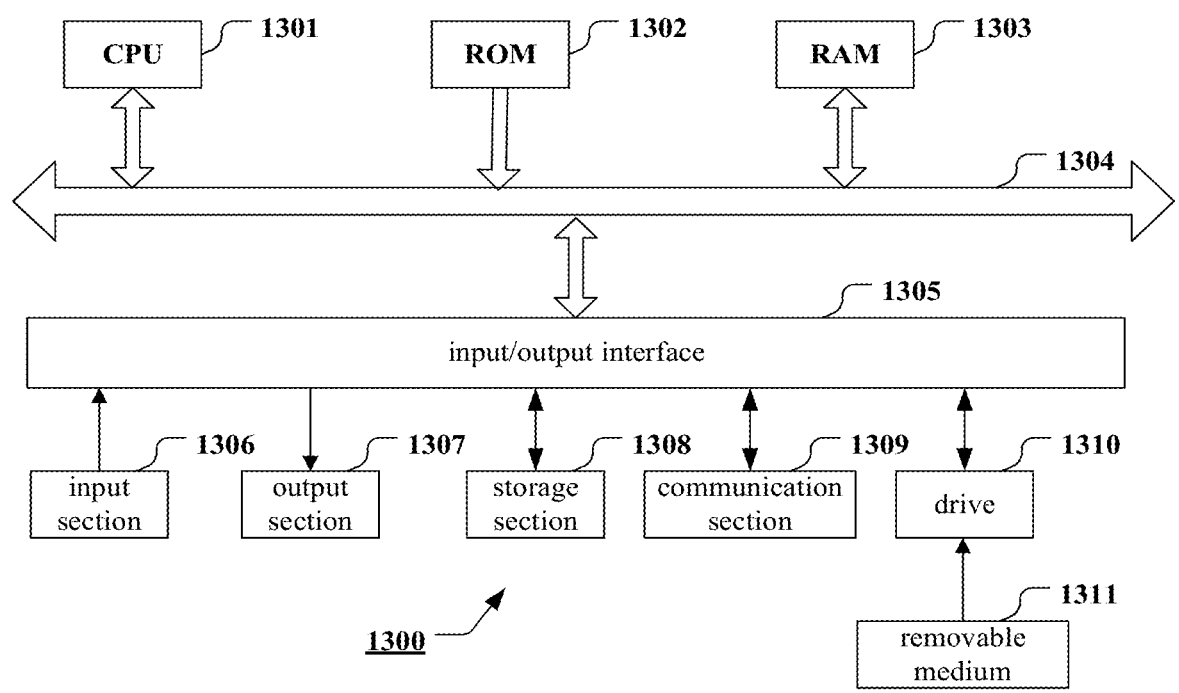
FIG. 13 is a block diagram of an exemplary structure of a computer implementing the method and apparatus according to the present disclosure.

In FIG. 13, a computation processing unit (i.e., a CPU) 1301 executes various processing according to a program stored in a Read Only Memory (ROM) 1302 or a program loaded to a Random Access Memory (RAM) 1303 from a storage section 1308. In the RAM 1303, if necessary, data required for the CPU 1301 in executing various processing and the like is also stored. The CPU 1301, the ROM 1302 and the RAM 1303 are linked to each other via a bus 1304. An input/output interface 1305 is also linked to the bus 1304.

The following components are linked to the input/output interface 1305: an input section 1306 including a keyboard, a mouse and the like, an output section 1307 including a display such as a Cathode Ray Tube (CRT) and a Liquid Crystal Display (LCD), a speaker and the like, the storage section 1308 such as a hard disk and the like, and a communication section 1309 such as a network interface card like a LAN card, a modem and the like. The communication section 1309 performs communication processing via a network such as the Internet. If necessary, a drive 1310 can also be linked to the input/output interface 1305. A removable medium 1311 such as a magnetic disk, an optical disk, a magneto-optical disk, a semiconductor memory and the like is mounted on the drive 1310 as required such that a computer program read out therefrom is installed in the storage section 1308 as required.

In a case that the series of processing above is implemented in software, a program constituting the software is installed from the network such as the Internet or the storage medium such as the removable medium 1311.

It is understood by those skilled in the art that the storage medium is not limited to the removable medium 1311 shown in FIG. 13 in which the program is stored and which is distributed separately from the apparatus so as to provide the program to the user. Examples of the removable medium 1311 include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM 1302, the hard disk contained in the storage section 1308 or the like, in which the program is stored, and is distributed to the user together with the apparatus containing the storage medium.

Embodiments of the present disclosure also relates to a program product on which machine-readable instruction codes are stored. The instruction codes can perform the methods according to the above embodiment when read and executed by a machine.

Accordingly, the present disclosure also includes storage medium carrying the program product on which the machine-readable instruction codes are stored. The storage media includes a soft-disk, an optical disk, a magnetic disk, a storage card, a storage stick and the like, but is not limited thereto.

Embodiments of the present disclosure also include an electronic apparatus. The electronic apparatus includes a circuit. The circuit is configured to perform mobility measurement on current dual-connection nodes for determining a connection transfer mode in a case that a service quality of at least one of current dual-connection nodes for the mobile communication terminal communicating in a dual-connection scenario is lower than a predetermined level. The circuit is further configured to determine a mode for reporting a result of the mobility measurement based on a measurement condition of at least one of the current dual-connection nodes.

In the above description of embodiments of the present disclosure, a feature described and/or illustrated in an embodiment may be applied to one or more other embodiments in a same or similar manner, or may be combined with a feature in other embodiments, or may replace a feature in other embodiments.

It should be emphasized that, the term "include/contain", as used in the present disclosure, means existence of a feature, an element, a step or a component, but does not exclude existence or addition of one or more other features, elements, steps or components.

In the above examples and embodiments, numeric reference characters are used for representing various steps and/or units. Those skilled in the art should understand that the reference characters are only used for facilitating description and illustration rather than representing an order or other limits.

Furthermore, the methods in the present disclosure are not limited to be performed in the time order as described, but may be performed in other time orders or in parallel or independently. Therefore, the performing order of the method described in the present disclosure is not a limit to the technical scope of the present disclosure.

Although the invention is disclosure by describing the above embodiment of the present disclosure, it should be noted that each of the above example and embodiment is not for limiting but for illustrating. Those skilled in the art may make various modifications, improvements and equivalents within the spirit and scope of the appended claims. The modifications, improvements and equivalents should also be included in the protection scope of the present disclosure.

The invention claimed is:

1. An electronic device in a wireless communication system, the electronic device comprising:
   circuitry, configured to
   communicate with a first node and a second node via different carriers for dual connectivity;
   initiate mobility measurement on at least one of the first node and the second node;
   determine a reporting mode for reporting measurement result of the mobility measurement among current dual-connection nodes, in association with likelihood of a radio link failure of the first node or the second node within a predetermined time from a current time and an expected duration between determination of available one or more target nodes and occurrence of the radio link failure of the first node or the second node, in advance to the radio link failure of the first node or the second node, based on expiration waiting time of timers for at least one of the first node and the second node, the expiration waiting time of timers being a difference between the current time and an expected time of the timers;
   report the measurement result of the first node to the first node, or, report the measurement result of the second node to the second node respectively, based on the determined reporting mode; and
   receive a confirmation from at least one of the first node and the second node, in response to a node transfer request sent from at least one of the first node and the second node to the one or more target nodes to change connection transfer mode, based on the determined reporting mode.

2. The electronic device according to claim 1, wherein the connection transfer mode is, maintaining connection to one of the current dual-connection nodes, and transferring connection to the other node to the at least one of the one or more target nodes, to maintain a dual-connection state.

3. The electronic device according to claim 2, wherein the circuitry is configured to, determine a priority order for reporting based on one or more of the following principles, to perform a measurement result report:
   the one having a worse channel quality of source node is prior,
   the one having a better signal of target node is prior,
   a coverage-based measurement evert is prior to a load-based measurement event,
   a node whose timer expires earlier is prior, and
   a macro base station node is prior to a low power node.

4. The electronic device according to claim 1, wherein the connection transfer mode is, maintaining connections to both of the current dual-connection nodes, and adjusting secondary carriers of respective connection nodes.

5. The electronic device according to claim 3, the circuitry is configured to, the mobility measurement and report only for a frequency point contained in a measuring object of inter-frequency measurement or inter-system measurement of each of the current dual-connection nodes.

6. The electronic device according to claim 1, wherein the circuitry is configured to, in which a serving cell has a quality higher than an absolute threshold, triggering inter-frequency measurement.

7. The electronic device according to claim 1, wherein the expiration waiting time is a difference between a current time and an expected expiration time of the timers.

8. The electronic device according to claim 1, wherein the circuitry is configured to report measurement result of the first node to the first node, or, report measurement result of the second node to the second node respectively,
   when an expiration waiting time of T310 timers for the first node and the second node are both greater than a predetermined threshold; or
   when, for each of the first node and the second node, the expiration waiting time of the T310 timer is greater than that of a TTT timer by a predetermined threshold.

9. The electronic device according to claim 1, wherein the reporting mode is selected from a first mode which the measurement result of the first node is reported only to the first node and the measurement result of the second node is reported only to the second node, a second mode which the measurement result of the first node and the second node is reported to both of the first node and the second node, a third mode which the measurement result of the first node and the second node is reported to only one of the first node and the second node, and a fourth mode which the measurement result of the first node and the second node is reported to the first node as a primary node while the measurement result of the second node is reported to the second node, based on the expiration waiting time of timers for at least one of the first node and the second node.

10. The electronic device according to claim 1, wherein the circuitry is configured to
determine whether the link failure will occur to at least one of the first node and the second node within the predetermined time from the current time, based on an expiration waiting time of T310 timers for the first node and the second node; and
determine whether the expected duration is sufficient for reporting measurement result and changing the connection transfer mode, based on the expiration waiting time of T310 timers and TTT timers by a predetermined threshold.

11. The electronic device according to claim 10, wherein the circuitry is configured to
determine that the link failure will not occur to any of the first and the second nodes based on the expiration waiting time of timers for the first node and the second node within the predetermined time from the current time, when the expiration waiting time of T310 timers for the first node and the second node are both greater than a predetermined threshold, and
report measurement result of the first node to the first node, or, report measurement result of the second node to the second node respectively.

12. The electronic device according to claim 10, wherein the circuitry is configured to
determine that the link failure will not occur to any of the first and the second nodes based on the expiration waiting time of timers for the first node and the second node within the predetermined time from the current time, when the expiration waiting time of T310 timers for the first node and the second node are both greater than a predetermined threshold, and
report measurement result of the first node to both of the first node and the second node.

13. The electronic device according to claim 10, wherein the circuitry is configured to
determine that the expected duration is sufficient for reporting measurement result and changing the connection transfer mode, when, for each of the first node and the second node, the expiration waiting time of the T310 timer is greater than that of the ITT timer by the predetermined threshold, and
report measurement result of the first node to the first node, or, report measurement result of the second node to the second node respectively.

14. The electronic device according to claim 10, wherein the circuitry is configured to
determine that the expected duration is sufficient for reporting measurement result and changing the connection transfer mode, when the expiration waiting time of the T310 timer is greater than that of the TIT timer by the predetermined threshold, and
report measurement result of the first node to both of the first node and the second node.

15. The electronic device according to claim 10, wherein the circuitry is configured to
determine that the link failure will not occur to the first node within e predetermined time from the current time, but the link failure will occur to the second node within the predetermined time from the current time, when the expiration waiting time of T310 timer for the first node is greater than a predetermined threshold, and the expiration waiting time of T310 timer for the second node is smaller than the predetermined threshold, and
report measurement result of the first node and the second node only to the first node.

16. The electronic device according to claim 10, wherein the circuitry is configured to
determine that the expected duration is sufficient for reporting measurement result and changing the connection transfer made for the first node but not sufficient for the second node, when the expiration waiting time of the T310 timer for the first node is greater than that of the TIT timer by a predetermined threshold, and the expiration waiting time of the T310 timer for the second node is not greater than that of the TTT timer by a predetermined threshold, and
report measurement result of the first node and the second node only to the first node.

17. The electronic device according to claim 10, wherein the circuitry is configured to
determine that the link failure will occur to any of the first and the second nodes based on the expiration waiting time of timers for the first node and the second node within the predetermined time from the current time, when the expiration waiting time of T310 timers for the first node and the second node are both smaller than a predetermined threshold, and
report measurement result of the first node and the second node to both of the first node and the second node.

18. The electronic device according to claim 10, wherein the circuitry is configured to
determine that the expected duration is not sufficient for reporting measurement result and changing the connection transfer mode, when the expiration waiting time of the T310 timers are less than that of the TTT timers by the predetermined threshold, and
report measurement result of the first node and the second node to both of the first node and the second node.

* * * * *